United States Patent [19]
Suhami et al.

[11] Patent Number: 5,109,410
[45] Date of Patent: Apr. 28, 1992

[54] TWO-LINE, HANDS-FREE TELEPHONE SYSTEM

[75] Inventors: Avraham Suhami, Paris, France; Shmuel Suhami, Tel-Aviv, Israel

[73] Assignee: Technology Management and Ventures, Ltd., Middlesex, United Kingdom

[21] Appl. No.: 480,046

[22] Filed: Feb. 14, 1990

Related U.S. Application Data

[63] Continuation-in-part of Ser. No. 461,311, Jan. 5, 1990.

[51] Int. Cl.$^5$ .................................... H04M 1/00
[52] U.S. Cl. ..................... 379/430; 379/428; 381/151
[58] Field of Search ............ 379/420, 421, 443, 444, 379/447, 161, 431, 430; 381/151, 68.6

[56] References Cited

U.S. PATENT DOCUMENTS

| | | | |
|---|---|---|---|
| 4,025,734 | 5/1977 | Aloupis | 381/151 |
| 4,588,867 | 5/1986 | Konomi | 379/430 |

FOREIGN PATENT DOCUMENTS

| | | | |
|---|---|---|---|
| 0088996 | 5/1983 | Japan | 381/151 |
| 0066293 | 4/1984 | Japan | 379/430 |
| 0066294 | 4/1984 | Japan | 379/430 |
| 2198612 | 6/1988 | United Kingdom | 379/420 |

Primary Examiner—James L. Dwyer
Assistant Examiner—Jhancy Augustus
Attorney, Agent, or Firm—Sandler, Greenblum & Bernstein

[57] ABSTRACT

A user can alternately send information to one of two parties on different telephone lines by mounting a microphone/speaker transducer in each ear, and connecting each transducer to a speech network device that is operatively connected to the respective telephone lines such that each transducer is connected to a different one of the telephone lines. The user may speak exclusively to only one of the parties by selectively muting the transmission of microphone signals through the speech network device connected to the telephone line connected to other party. Because the transducers are of the hands-free type, the user can easily manipulate the muting switch of one or the other of the speech network devices in accordance with which of the two parties to whom he wishes to speak in private.

11 Claims, 4 Drawing Sheets

TWO-LINE, HANDS-FREE TELEPHONE SYSTEM

RELATED APPLICATION

This application is a continuation in part application of copending application Ser. No. 461,311 (hereinafter referred to and the '311 application) filed Jan. 5, 1990, the disclosure of which is hereby incorporated by reference.

TECHNICAL FIELD

This invention relates to a two-line, hands-free telephone system, and more particularly, to a system by which a user is able to simultaneously hear each of two different parties on different telephone lines, and to limit speaking to only one or the other of the parties at any time in a hands-free environment.

BACKGROUND OF THE INVENTION

In order for a user to converse, alternatively, with two different parties on separate telephone lines, it is conventional to connect the telephone lines to a single telephone set through a two-position switch that is capable of placing one of the parties "on hold" while the other of the parties is operatively connected to the telephone set of the user. By suitable manipulation of the switch, the user can alternately speak to and hear each of the parties. This arrangement is disadvantageous in many situations where the user would like to hear at all times what each party is saying, but be able to limit what he is saying to only one or the other of the parties.

At the present, a "conference call" connection is available wherein all of the telephone lines are merged such that the user and each party hears what any of the others say, and all can speak simultaneously. Thus, separate, private conversations between the user and the other parties is not possible.

Finally, a user can utilize two separate telephone sets for connection to the two parties via separate telephone lines, and can simultaneously hold the two receivers to his ears thereby hearing each party. To speak to only one of the parties, the user must physically move the mouthpiece of one of the receivers away from his mouth while speaking into the other mouthpiece. This is physically inconvenient to do and often does not ensure complete privacy.

It is therefore an object of the present invention to provide a new and improved method of and apparatus for enabling a user to simultaneously hear each of two different parties on different telephone lines, and to limit speaking to only one or the other of the parties at any time in a hands-free environment.

BRIEF DESCRIPTION OF THE INVENTION

According to the present invention, a user can alternately send information to one of two parties on different telephone lines by mounting a microphone/speaker transducer in each ear, and connecting each transducer to a speech network device that is operatively connected to the respective telephone lines such that the speaker of each transducer is connected to a different one of the telephone lines. The user thus hears each of the parties, and may speak exclusively to only one of the parties by selectively muting the operation of the speech network device connected to the telephone line connected to other party. Because the transducers are of the hands-free type, the user can easily manipulate the muting switch of one or the other of the speech network devices in accordance with which of the two parties he wishes to speak in private.

Apparatus according to the present invention comprises a pair of microphone/speaker transducers constructed and arranged to fit into the respective ear canals of a user, and a pair of speech network devices respectively connected between each transducer and a respective one of two telephone lines to which different parties are connected. Muting means are associated with each of the speech network devices, and are selectively operable by the user for disconnecting the microphone of a transducer from the speech network device with which the operable muting means is associated whereby the user is able to hear both parties at all times, and to speak to one, or the other, or both parties simultaneously, depending upon operation of the muting means.

Preferably, the muting means is a depressable, ON/OFF, action maintained, push-button switch that effects a muting operation while depressed and in the ON position.

In the preferred form of the invention, each speech network device includes a speech network, a ringer, and a two-position switch connected to a respective one of the telephone lines, each switch having a first position that connects a telephone line to the ringer, and a second position that connects the telephone line to the speech network. In this situation, the apparatus of the invention also includes a keypad, a dialer circuit, and a 2-position switch for selectively connecting the keypad and dialer circuit to one or the other of the speech networks.

BRIEF DESCRIPTION OF THE DRAWINGS

Embodiments of the present invention are shown by way of example in the accompanying drawings wherein.

DETAILED DESCRIPTION

Figure 1:
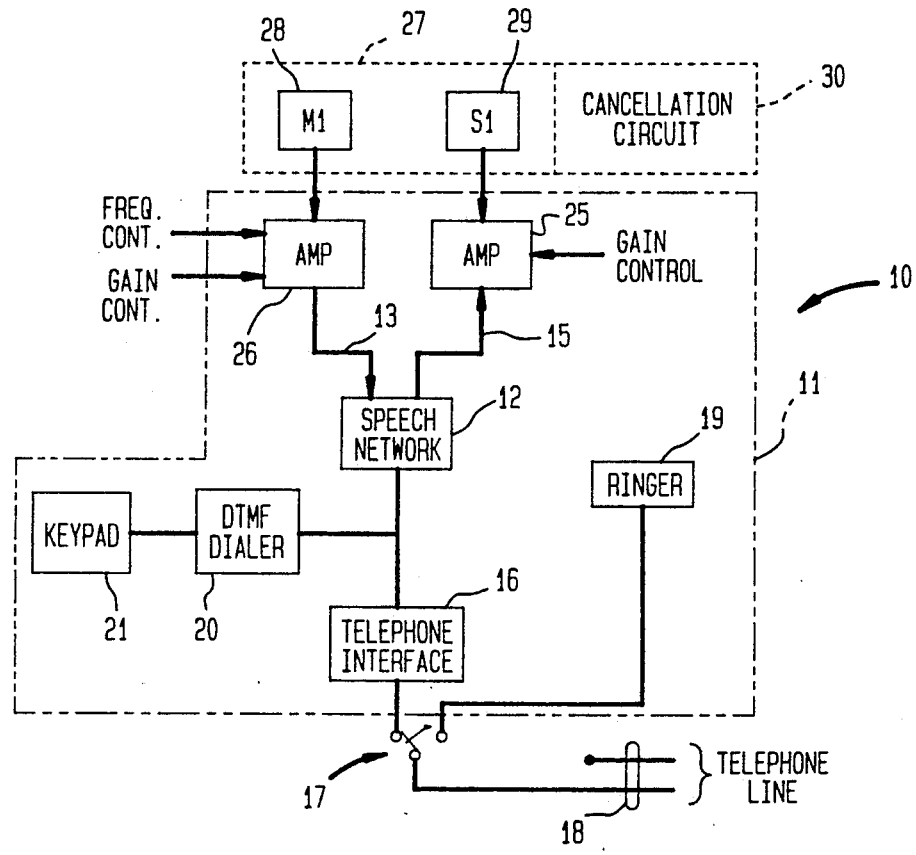
FIG. 1 is a block diagram showing a single microphone/speaker transducer associated with a telephone set one connected to a single telephone line.

Referring now to the drawings, reference numeral 10 designates a hands-free telephone assembly of the type disclosed in the '311 application. Assembly 10 includes base 11 containing the usual components of a conventional telephone set including speech network 12 having input channel 13 and output channel 15, the speech network being connected to telephone interface 16. Two position switch 17, under control of a user, is effective to alternatively connect telephone line 18 to interface 16 or to ringer 19. Switch 17 thus serves the function of the off-hook switch of a conventional telephone set. Finally, base 11 also includes the usual dial mechanism in the form of a DTMF circuit 20 which is effective, under control of keypad 21 to dial a user selected number into the telephone line when switch 17 connects the outside telephone line to interface 16.

Associated with base 11 is gain-controllable amplifier 25 in output channel 15 of speech network 12, and gain- and frequency controllable amplifier 26 in input channel 13 of the speech network. Housing 27 contains a primary transducer in the form of primary microphone 28 connected to the input to amplifier 26, and primary speaker 29 connected to the output of amplifier 25. According to the present invention, housing 27 is constructed and arranged so as to fit within the ear canal of a user and to be releasable maintained therein in the manner described below.

Finally, the invention also includes cancellation circuit 30, which may be located within assembly 10, for suppressing positive feedback between the primary microphone and speaker. Such means are necessary to ensure that the receiver output picked up by the microphone does not generate a regenerative positive feedback causing the circuit to oscillate. Details of several cancellation mechanisms according to the present invention are discussed below.

Figure 2:
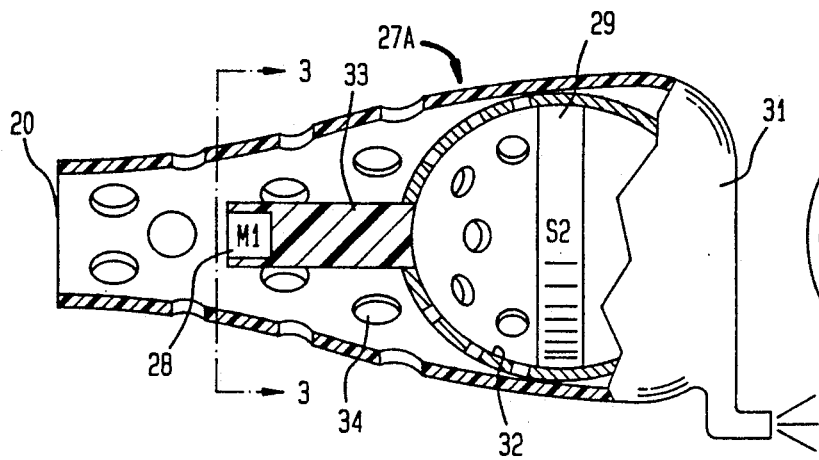
FIG. 2 is a sectional schematic view of a microphone/speaker packaged in a housing suitable for insertion into the ear canal of a user.
Figure 3:
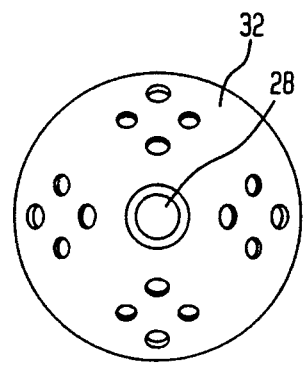
FIG. 3 is a section taken along the line 3—3 of FIG. 2.

Referring now to FIG. 2, a housing designed to permit insertion into the ear canal of a user is designated by reference numeral 27A. Housing 27A is an elongated, flexible, and generally conical hollow sleeve whose smaller axial end 30 is open and whose larger axial end is closed as indicated at 31. Contained within housing 27A at end 31 is speaker 29 which snugly fits inside the closed end of the sleeve. Forwardly of the speaker is dome-shaped enclosure 32 of sheet material which is provided with a plurality of apertures. In the central portion of the dome is mounted, in cantilever fashion, sound-absorbing rod 33 which projects toward open end 30 of the sleeve; and unidirectional microphone 28 is mounted on the free end of rod 33.

As shown in FIG. 2, the sleeve has a plurality of circular holes 34 whose diameter is a function of the position of the holes along the length of the sleeve. The diameter of holes 34 near the narrower end 31 of the sleeve is smaller than the diameter of the holes remote from the narrower end of the sleeve. Selection of the size of the holes provides the designer with a parameter that enhances transmission of selected bands of frequencies.

The '311 application contemplates a cancellation mechanism that is effective to feed the primary microphone amplifier with an inverted signal derived from a secondary microphone of a second receiver/microphone assembly situated at a distance from the primary receiver/microphone assembly which is located in the ear canal of the user. The second assembly is inserted in a mold resembling the ear geometry for faithfully simulating the reflections from the walls of the ear canal. Both speakers in each of the primary and secondary assemblies are fed by the same input signal. Such an arrangement generates at the output of the microphone situated in the second receiver/microphone assembly a signal similar in frequency and time to the undesired feedback picked up by the microphone in the ear canal. Subtracting it from the output of the first microphone effectively cancels the unwanted feedback and leaves only the signal emanating from the ear canal.

Figure 5:
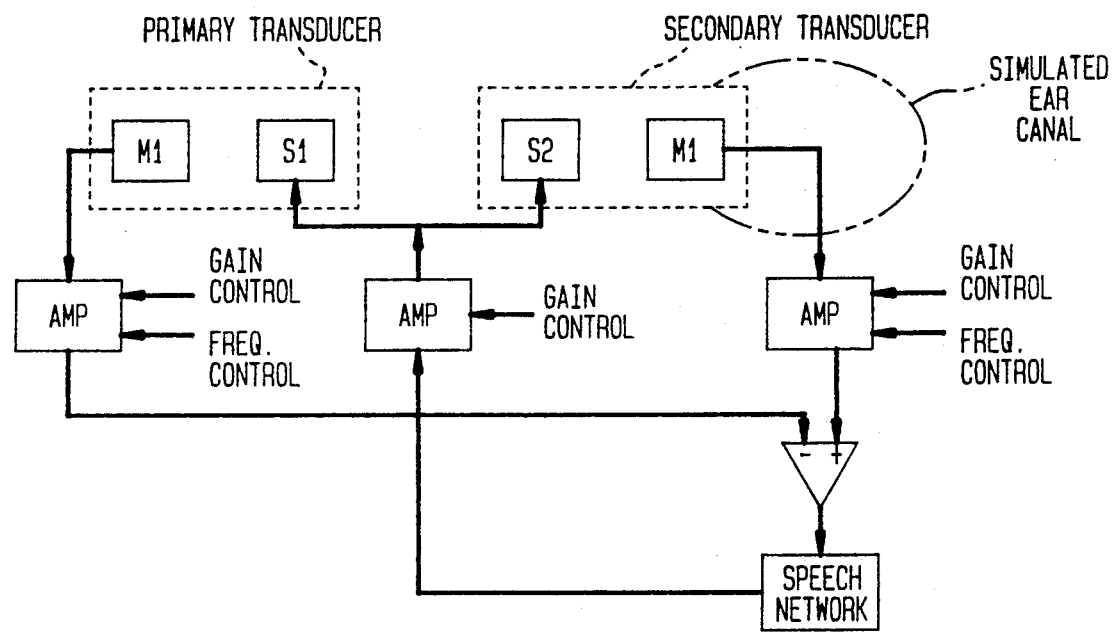
FIG. 5 is a block diagram showing a technique for suppressing feedback using the transducer shown in FIG. 2.

A circuit for achieving the results described above is shown in FIG. 5. As shown, a single gain controllable amplifier drives the speakers in each of the primary and secondary transducers. Each of the microphones in the two transducers is applied to the speech network of the telephone through gain and frequency controllable amplifiers whose outputs are connected to the respective inputs of a differential amplifier. The output of the differential amplifier will be the desired signal without a significant amount of feedback.

Alternatively, the cancellation mechanism may include a secondary microphone positioned behind the primary speaker at a symmetrical position relative to the primary microphone and at such a distance that the magnitude of the sound emanating from the speaker and picked up by the primary microphone will be equal to that picked up by the secondary microphone. The position of the secondary microphone is selected in such a way that sound waves and the corresponding electrical signals are in phase opposition to that of the primary microphone. In such case, adding the outputs of both microphones causes the desired cancellation of spurious speaker-to-microphone feedback. If, however, the positions of the microphones is such that the sounds they pick up are in phase, the desired cancellation may be achieved by inverting the output signal from one of the microphones before combining the outputs.

The speaker-and-two-microphone assembly may also be tuned so as to eliminate noise and other sounds that reach both microphones. After the speaker-and-two-microphones assembly is plugged into the ear, the ratio of sound picked up by the two microphones respectively may be adjusted to be the same, irrespective of the origin of the sound, whether it emanates from the surroundings or from the speaker that is in-between. This adjustment may be done by changing the distance of the secondary microphone from the back of the speaker, because this procedure changes the magnitude of the sound picked by it and coming from the speaker without appreciably changing the amount of sound detected and coming from the surroundings. Thus, changing the distance of the second microphone from the speaker is a practical way to equate these ratios. By then amplifying, by an appropriate amount, the signal of the secondary microphone and subtracting it from the output of the first microphone, effectively cancels both the feedback from the speaker and the surrounding ambient sounds and leaves unaffected the voice sound emanating from the ear canal.

Figure 4:
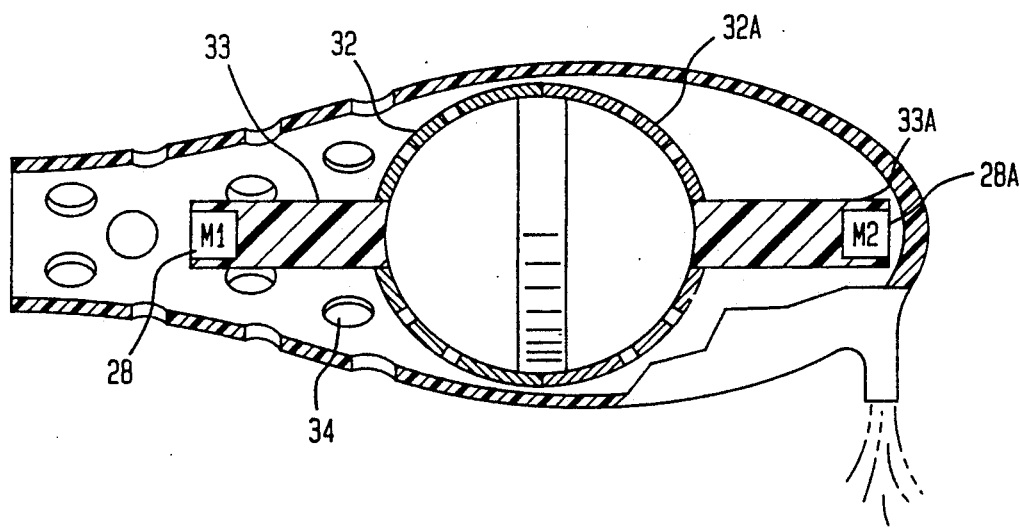
FIG. 4 is a sectional schematic of another embodiment of the transducer shown in FIG. 2 for suppressing feedback between the microphone and speaker when each is in the same housing.

The arrangement of a speaker-and-two-microphone assembly is shown in FIG. 4. In this arrangement, the speaker is provided with front and rear domes 32, 32A, and primary microphone 28 is mounted in the same way as shown in FIG. 2. Secondary microphone 28A is mounted in sound-absorbing rod 33A that extends from the central portion of rear dome 32A in a rearward direction, i.e., in a direction away from the ear canal.

Figure 6:
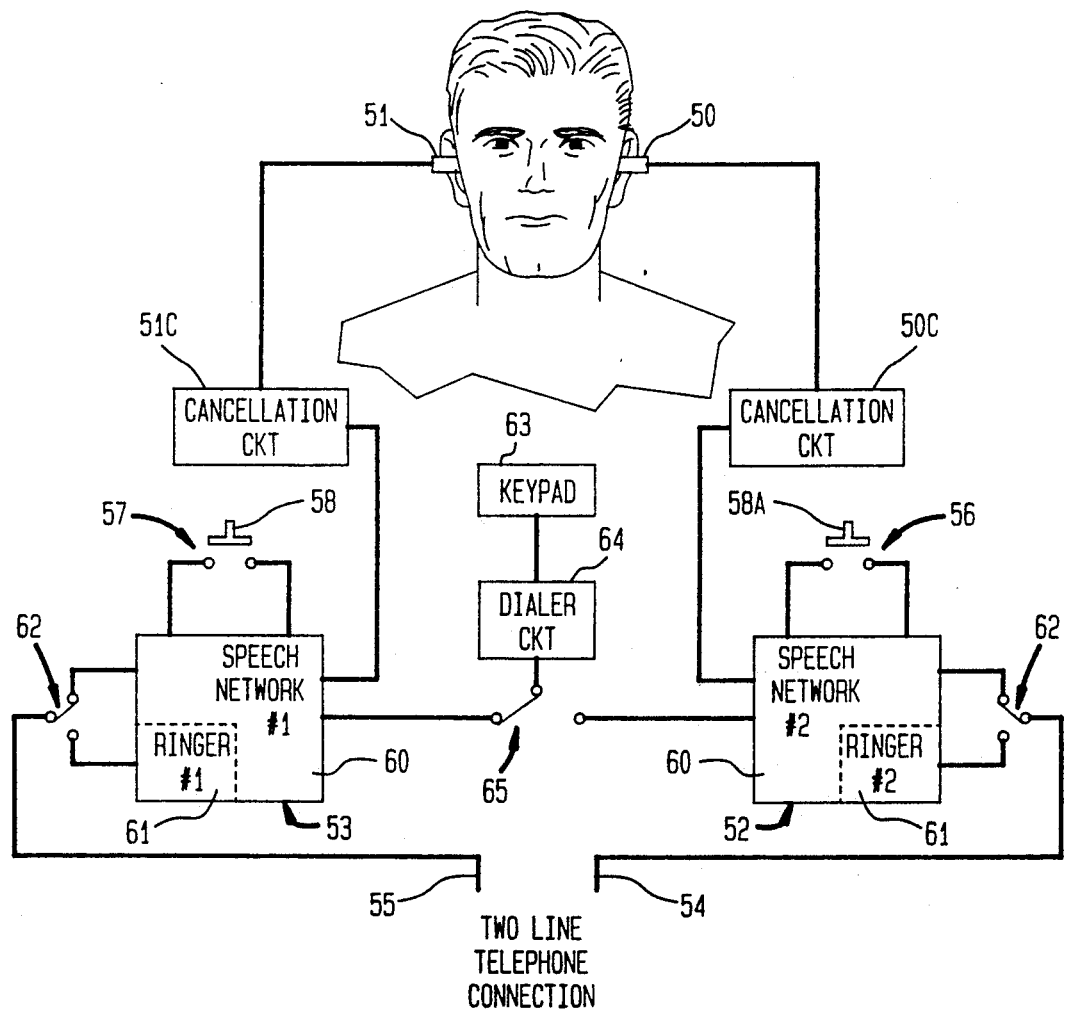
FIG. 6 is a schematic block diagram showing the application of the transducer of FIG. 2 to the present invention which provides a two-line, hands-free telephone system.

The transducers shown in FIGS. 2 and 4 are suitable for the present invention, by which a user may hear, simultaneously, each of two parties on separate telephone lines, and may speak with only one, or the other, or both of the parties. According to the present invention, a user can alternately send information to one of two parties on different telephone lines by mounting a microphone/speaker transducer, typically like those shown in FIGS. 2 and 4, in each ear as shown in FIG. 6. Each of the transducers is connected to a speech network device that is operatively connected to the respective telephone lines such that the speaker of each transducer is connected to a different one of the telephone lines. The user thus hears each of the parties, and may speak exclusively to only one of the parties by selectively muting the operation of the speech network device connected to the telephone line connected to other party. Because the transducers are of the hands-free type, the user can easily manipulate the muting switch of one or the other of the speech network devices in accordance with which of the two parties he wishes to speak in private.

Figure 5A:
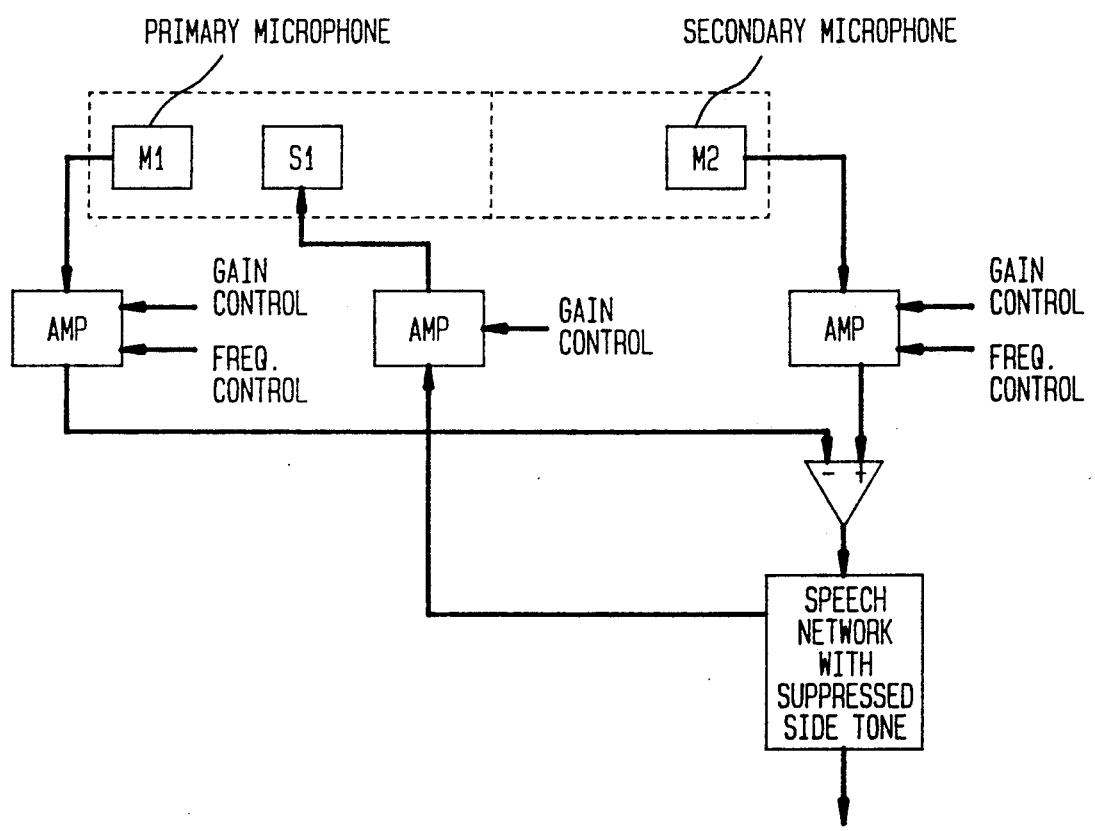
FIG. 5A is a block diagram showing an alternate technique for suppressing feedback using the transducer of FIG. 4.

Apparatus according to the present invention comprises a pair of microphone/speaker transducers 50, 51 constructed and arranged to fit into the respective ear canals of a user. Preferably, the transducers are of the type shown in FIG. 4. Each transducer is connected to associated cancellation circuit 50C and 51C as shown in FIG. 5A wherein each transducer comprises a speaker and two microphones connected differentially so as to cancel speaker-to-microphone feedback. Each transducer comprises a speaker and two microphones, and amplifier means for amplifying the outputs of the microphones, and including a differential amplifier constructed and arranged to algebraically add the amplified outputs of the microphones, the gain of the amplifier means being such that the output of the differential amplifier is cancelled in the absence of input speech to the microphones.

Speech network devices 52, 53 are respectively connected between each cancellation circuit and a respective one of two telephone lines 54, 55 to which different parties are connected. The speech network devices preferably have their sidetones suppressed in order to reduce speaker-to-microphone feedback.

Muting means 56, 57 are associated with each of the speech network devices, and are selectively operable by the user for disconnecting the microphone of a transducer from the speech network device with which the operable muting means is associated whereby the user is able to hear both parties at all times, and to speak to one, or the other, or both parties simultaneously, depending upon operation of the muting means.

Preferably, each muting means is in the form of a depressable, ON/OFF, action maintained push-button switch 58 that effects a muting operation of the speech network associated with the muting means while the switch is depressed and in the ON position. That is to say, when switch 58 is depressed and in the ON position, the bridging of the contacts of the switch serves to shunt the voice circuit carrying the signal from the microphone to the speech network with which the muting means is associated. This condition of the switch is self-maintained until the user again manually depresses the switch to release it and open the shunt. As a result, speech information from the user is blocked by the muted speech network. When the switch is subsequently depressed and thus moves to its OFF position, the link between the voice signal coming from the microphone through the cancellation circuit, and the speech network, is re-established.

In operation, if the user wishes to transmit his speech only to the party connected to line 54, he would activate the muting means associated with line 55 by manually depressing button 58 associated with muting means 57 moving the button to its ON position, and then begin speaking. Under this condition, the party on line 54 would be connected to the microphone associated with transducer 50, but the party on line 55 would remain disconnected from the microphone associated with transducer 51. Because the hands of the user are free, manual depression of the muting switch is effected easily. The connection would be maintained until the user subsequently depresses button 58 moving the latter to its OFF position. At all times, the user remains connected to both telephone lines and is able to hear speech from each of the parties. If the user wishes to speak to both parties simultaneously, neither muting means is activated.

In the preferred form of the invention, each speech network device includes speech network 60, ringer circuit 61, and two-position switch 62 connected to a respective one of telephone lines 54, 55. Each of switches 62 has a first position that connects a telephone line to the ringer, and a second position (which is shown in FIG. 6) that connects the telephone line to the speech network. After a connection is made with an outside line, switches 62 occupy the positions shown in FIG. 6. Each ringer circuit includes ringing means connected to a respective telephone line through two-position switch 61. Each of the ringing means is tuned to a different frequency for enabling the ringing of one line to be distinguished from ringing of the other line.

The apparatus of the invention also includes keypad 63, dialer circuit 64, and 2-position switch 65 for selectively connecting the keypad and dialer circuit to one or the other of the speech networks. That is to say, when the user wishes to dial out to a party, he moves switch 65 to a position that connects dialer 64 to either one of networks 60 that is free, and keys in the called number into keypad 63. At this time switch 62 for the selected network would be in the off-hook position shown in FIG. 6. After the call is complete, switch 62 is moved to its other, or on-hook position.

Because of the use of the microphone/speaker transducers, both hands of the user are at all times free, first of all to select the line to call out on by operating switch 65, and to go off-hook by operating switch 62. Once a connection is made, the user can then place a second call, all during the time that he is connected to and taking to the first party. When both parties are connected, the user has both hand free for note taking, for example, and for manipulating muting means 56, 57 for controlling the party to whom he wishes to speak. In this manner, a private conversation can be held with either of the parties.

The principles described above are applicable to so-called "cordless" or "cellular" type telephones in which the connection between the speech network device and a telephone line is effected by suitable transceivers located in a base unit and a mobile unit.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A method by which a user can alternately send information to one of two parties on different telephone lines comprising the steps of:

a) mounting a microphone/speaker transducer in each ear of the user;

b) connecting each transducer to a different one of two speech network devices that are operatively connected to respective different telephone lines such that the speaker of each transducer is connected to a different one of the telephone lines; and c) selectively muting one of the speech network devices when the user wishes to speak to only the party on the telephone line that connects to the other of the speech network device.

2. A method according to claim 1 including the step of selectively muting the other of the speech network devices when the user wishes to speak to only the party on the telephone line that is connected to said one of the speech network devices.

3. A method according to claim 1 wherein each transducer comprises a speaker and two microphones connected differentially so as to cancel speaker-to-microphone feedback.

4. A method according to claim 1 wherein one transducer acts alternately either as a speaker for emitting sound, or as a microphone for converting sound to electrical signals.

5. Apparatus comprising;

a) a pair of microphone/speaker transducers constructed and arranged to fit into the respective ear canals of a user;

b) a pair of speech network devices respectively connected between each transducer and a respective one of two telephone lines to which different parties are connected; and c) muting means associated with each of the speech network devices, and selectively operable for disconnecting the microphone of a transducer from the speech network device with which the operable muting means is associated whereby the user is able to hear both parties at all times, and to speak to one, or the other, or both parties simultaneously, depending upon operation of the muting means.

6. Apparatus according to claim 5 including a pair of ringing means each of which is connected to a respective telephone line through a two-position switch, each ringing means being tuned to a different frequency for enabling the ringing of one line to be distinguished from ringing of the other line.

7. Apparatus according to claim 5 wherein each transducer comprises a speaker and two microphones, and amplifier means for amplifying the outputs of the microphones, and including a differential amplifier constructed and arranged to algebraically add the amplified outputs of the microphones, the gain of the amplifier means being such that the output of the differential amplifier is cancelled in the absence of input speech to the microphones.

8. Apparatus according to claim 7 wherein each speech network device is linked to a telephone line through two transceivers, one transceiver being constructed and arranged to transmit signals to a mobile unit, and the other being constructed and arranged to receive signals from the mobile unit.

9. Apparatus according to claim 5 wherein said muting means is a depressable, ON/OFF, action-maintained push-button switch that effects muting while depressed.

10. Apparatus according to claim 5 including a keypad, a dialer circuit, and a 2-position switch for selectively connecting the keypad and dialer circuit to one or the other of the speech networks.

11. Apparatus according to claim 5 wherein each transducer is sequentially able to act both as a speaker for emitting sound, and as a microphone for transforming sound into electrical signals.

* * * * *